(12) United States Patent
Mukasa et al.

(10) Patent No.: US 6,389,210 B1
(45) Date of Patent: May 14, 2002

(54) PROBE WITH OPTICAL WAVEGUIDE AND METHOD OF PRODUCING THE SAME

(75) Inventors: Koichi Mukasa; Kazuhisa Sueoka, both of Sapporo (JP)

(73) Assignee: Japan Science and Technology Corporation (JP)

( * ) Notice: Subject to any disclaimer, the term of this patent is extended or adjusted under 35 U.S.C. 154(b) by 0 days.

(21) Appl. No.: 09/485,825

(22) PCT Filed: May 20, 1999

(86) PCT No.: PCT/JP99/02643

§ 371 Date: Feb. 16, 2000

§ 102(e) Date: Feb. 16, 2000

(87) PCT Pub. No.: WO99/67648

PCT Pub. Date: Dec. 29, 1999

(30) Foreign Application Priority Data

Jun. 25, 1998 (JP) .......................... 10-178263

(51) Int. Cl.[7] .............................. G02B 6/10; H01L 31/00
(52) U.S. Cl. ..................... 385/131; 257/184; 385/129; 385/130
(58) Field of Search ................. 385/129–131, 385/133, 12; 257/183, 184; 438/57; 359/656

(56) References Cited

U.S. PATENT DOCUMENTS

| | | | | |
|---|---|---|---|---|
| 4,178,197 A | * | 12/1979 | Marinace ............... | 148/175 |
| 5,237,639 A | * | 8/1993 | Kato et al. ............. | 385/131 |
| 5,559,330 A | * | 9/1996 | Murashita .............. | 250/306 |
| 5,625,202 A | * | 4/1997 | Chai .................... | 257/94 |
| 5,900,647 A | * | 5/1999 | Inoguchi ................ | 257/76 |
| 5,923,637 A | * | 7/1999 | Shimada et al. ......... | 369/126 |
| 5,965,218 A | * | 10/1999 | Bothra et al. ........... | 427/578 |
| 5,969,821 A | * | 10/1999 | Muramatsu et al. ...... | 356/376 |
| 6,201,226 B1 | * | 3/2001 | Shimada et al. ......... | 250/201.3 |
| 6,215,114 B1 | * | 4/2001 | Yagi et al. ............. | 250/216 |

FOREIGN PATENT DOCUMENTS

| | | | | |
|---|---|---|---|---|
| JP | 06-289035 A | * | 10/1994 | ......... G01N/37/00 |
| JP | 10-093192 A | * | 4/1998 | ............ H01S/3/18 |
| JP | 11-142417 A | * | 5/1999 | ......... G01N/37/00 |
| JP | 11-281657 A | * | 10/1999 | ......... G01N/37/00 |

* cited by examiner

*Primary Examiner*—Akm E. Ullah
*Assistant Examiner*—Sarah U Song
(74) *Attorney, Agent, or Firm*—Lorusso & Loud

(57) ABSTRACT

To provide a probe having an optical waveguide which is robust and highly reliable, and a method of manufacturing the same. A probe having an optical waveguide includes an optical waveguide portion having a double hetero structure and comprising an $In_{1-x'-y'}Ga_{x'}Al_{y'}N$ layer (5), an $In_{1-x-y}Ga_xAl_yN$ layer (4), and an $In_{1-x''-y''}Ga_{x''}Al_{y''}N$ layer (3); and an $Al_xGa_{1-x}N$ probe portion (8) grown in a conical shape on the $In_{1-x-y}Ga_xAl_yN$ layer (4) of the optical waveguide portion.

6 Claims, 4 Drawing Sheets

PROBE WITH OPTICAL WAVEGUIDE AND METHOD OF PRODUCING THE SAME

TECHNICAL FIELD

The present invention relates to a tunneling microscope utilizing spin-polarized electrons, and more particularly to a probe used in such a tunneling microscope and a method of manufacturing the probe.

BACKGROUND ART

When a conventional probe is used in spin measurement, the following problems arise.

(1) Since a conventional probe does not have an optical waveguide, external light is radiated to the tip of the probe. Therefore, light is radiated onto the probe at a certain angle relative to the probe, so that only a portion of the probe which receives light comes into an excited state. That is, since light is not radiated uniformly on the tip portion of the probe, excitation of the entire tip portion of the probe cannot be attained. Therefore, the conventional probe is poor in terms of electron excitation efficiency and efficiency in extracting spin-polarized electrons. Accordingly, strong light must be radiated onto the probe in order to obtain spin-polarized electrons which are sufficient for microscopic observation.

(2) However, when strong light is radiated on the probe, excitation light is radiated onto a sample surface in close proximity to the tip portion of the probe, and thus reflection and absorption of the excitation light occur on the side of the sample surface.

(3) Further, the probe is excited by light scattered from the sample surface. Since the scattered light is polarized disorderly, the degree of spin polarization of spin-polarized electrons decreases, resulting in a decrease an in detection efficiency in spin measurement.

(4) The conventional probe is formed of GaAs or a like material. These materials are soft and prone to cleavage fracture. Therefore, the mechanical strength of the probe is low, and during use, the probe frequently breaks upon contact with a sample. In addition, since GaAs has a low melting point, the tip end of the probe fuses when excited with strong light. Further, when the GaAs probe is heated for cleaning. As having a high vapor pressure evaporates. As a result, the structure and the state of electrons of the tip end of the probe change, so that spin-polarized electrons having a high degree of spin polarization cannot be obtained. Further, due to the same reason, the conventional probe cannot be subjected to cleaning by application of heat for reuse.

DISCLOSURE OF THE INVENTION

An object of the present invention is to solve the above-described problems and to provide a probe having an optical waveguide which (1) enables spin measurement with high efficiency even under weak excitation light, (2) has high mechanical strength and is less prone to breakage, (3) can be used under strong excitation light, (4) facilitates cleaning of the probe tip end, (5) permits excitation of the probe tip end, and (6) suppresses the influence of excitation light on a sample; i.e., a probe having an optical waveguide which is robust and highly reliable. Another object of the present invention is to provide a method of manufacturing the probe.

To achieve the above objects, the present invention provides the following.

[1] A probe having an optical waveguide which comprises an optical waveguide portion having a double hetero structure and comprising an $In_{1-x'-y'}Ga_{x'}Al_{y'}N$ layer, an $In_{1-x-y}Ga_xAl_yN$ layer, and an $In_{1-x''-y''}Ga_{x''}Al_{y''}N$ layer; and an $Al_xGa_{1-x}N$ probe portion grown in a conical shape on the $In_{1-x-y}Ga_xAl_yN$ layer of the optical waveguide portion.

[2] A probe having an optical waveguide which comprises an optical waveguide portion having a double hetero structure and comprising an $In_{1-x'-y'}Ga_{x'}Al_{y'}N$ layer, an $In_{1-x-y}Ga_xAl_yN$ layer, layer, and an $In_{1-x''-y''}Ga_{x''}Al_{y''}N$ layer, where $0 \leq x, y, x', y', x'', y'', x+y, x'+y', x''+y'' \leq 1$, and the $In_{1-x-y}Ga_xAl_yN$ layer has a minimum band gap energy; and an $Al_xGa_{1-x}N$ layer, probe portion grown in a conical shape such that the probe portion is connected to a portion of the $In_{1-x-y}Ga_xAl_yN$ layer,layer, wherein light propagating through an optical waveguide layer constituted by the $In_{1-x-y}Ga_xAl_yN$ layer,layer is led to the probe portion in order to excite electrons at the tip end of the probe portion.

[3] A probe having an optical waveguide as described in [1] or [2] above, further characterized in that the $In_{1-x-y}Ga_xAl_yN$ layer, is formed to have a large thickness, and a portion of the layer is maintained unremoved, so that the portion serves as an inlet for incident excitation light.

[4] A method of manufacturing a probe having an optical waveguide, the method comprising: growing on a (0001) face of a sapphire substrate a double hetero structure comprising an $In_{1-x'-y'}Ga_{x'}Al_{y'}N$ layer, and an $In_{1-x''-y''}Ga_{x''}Al_{y''}N$ layer by use of organometallic vapor phase epitaxy to thereby form an optical waveguide portion; and growing an $Al_xGa_{1-x}N$ probe portion in a conical shape on the $In_{1-x-y}Ga_xAl_yN$ layer of the optical waveguide portion such that the $Al_xGa_{1-x}N$ probe portion is connected to the $In_{1-x-y}Ga_xAl_yN$ layer of the optical waveguide portion.

[5] A method of manufacturing a probe having an optical waveguide, the method comprising: growing on a (0001) face of a sapphire substrate a double hetero structure comprising an $In_{1-x'-y'}Ga_{x'}Al_{y'}N$ layer, an $In_{1-x-y}Ga_xAl_yN$ layer and $In_{1-x''-y''}Ga_{x''}Al_{y''}N$ layer, to thereby form an optical waveguide, where $0 \leq x, y, x', y', x'', y'', x+y, x'+y', x''+y'' \leq 1$ and the $In_{1-x-y}Ga_xAl_yN$ layer has a minimum band gap energy; exposing a portion of the $In_{1-x-y}Ga_xAl_yN$ layer; and growing an $Al_xGa_{1-x}N$ probe portion in a conical shape on the exposed portion of the $In_{1-x-y}Ga_xAl_yN$ layer,

[6] A method of manufacturing a probe having an optical waveguide as described in [4] or [5] above, further characterized in that the $In_{1-x-y}Ga_xAl_yN$ layer is formed to have a large thickness, and a portion of the layer is maintained unremoved, so that the portion serves as an inlet for incident excitation light.

As described above, in the present invention, the probe is formed of $Al_xGa_{1-x}N$, which is a hard material having a high melting point; and an optical waveguide having a double hetero structure and comprising an $In_{1-x'-y'}Ga_{x'}Al_{y'}N$ layer, an $In_{1-x-y}Ga_xAl_yN$ layer, and an $In_{1-x''-y''}Ga_{x''}Al_{y''}N$ layer is integrated with the probe by use of organometallic vapor phase epitaxy.

The most important feature of the present invention resides in use of $Al_xGa_{1-x}N$, which is a material having a small electron affinity, as a material of the probe. In contrast to the conventional technique, excitation light is led to the tip end of the probe via a waveguide provided inside the probe. Therefore, a sample surface is less likely to be affected by reflection and absorption of excitation light.

Further, since the entire tip end portion of the probe is excited, the probe has a high electron excitation efficiency, as well as a high efficiency in extracting spin-polarized electrons.

Moreover, unlike the conventional probe, the probe of the present invention is formed of a hard material, and therefore is less prone to breakage. In addition, since the melting point of the material is high, the probe can sustain electron excitation by use of a high output excitation light source, and cleaning at increased temperature can be performed. Therefore, the probe can be reused through cleaning at increased temperature.

BEST MODE FOR CARRYING OUT THE INVENTION

Embodiments of the present invention will now be described in detail.

Figure 1:
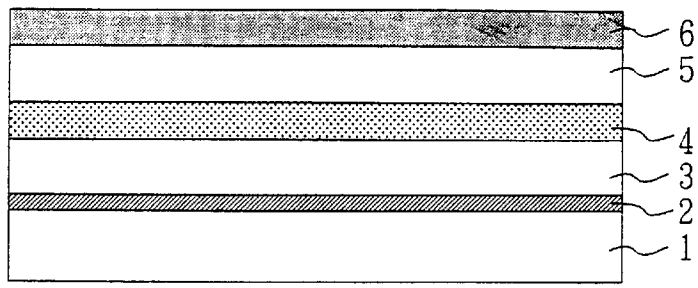
FIGS. 1(a)–1(d) are sectional views showing the steps of a method of manufacturing a probe having an optical waveguide according to a first embodiment of the present invention.
Figure 1:
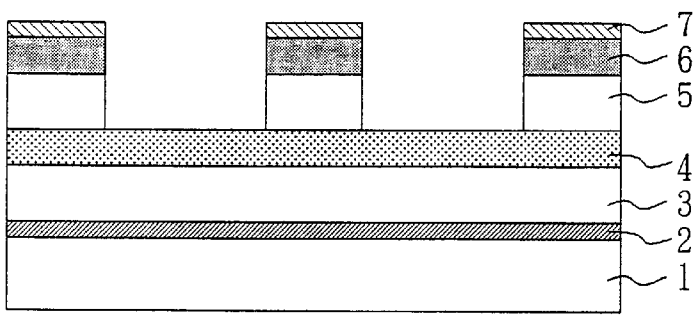
Figure 1:
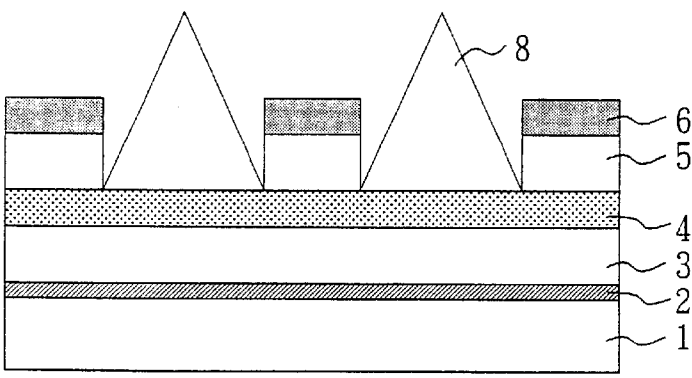
Figure 1:
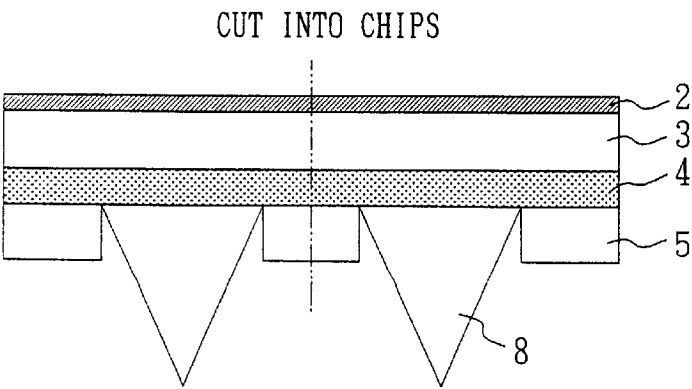
Figure 2:
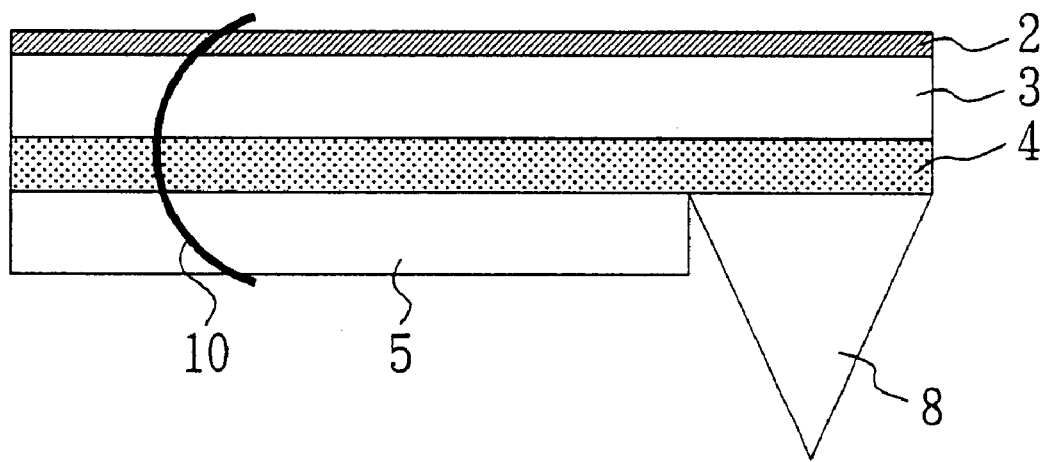
FIG. 2 is a sectional view of the probe having an optical waveguide according to the first embodiment of the present invention.

FIGS. 1(a)–1(d) are sectional views showing the steps of a method of manufacturing a probe having an optical waveguide according to a first embodiment of the present invention; and FIG. 2 is a sectional view of the probe having an optical waveguide manufactured by the method.

(1) First, as shown in FIG. 1(a), by use of organometallic vapor phase epitaxy, an $In_{1-x''-y''}Ga_{x''}Al_{y''}N$ buffer layer 2, an $In_{1-x''-y''}Ga_{x''}Al_{y''}N$ layer 3, an $In_{1-x-y}Ga_xAl_yN$ layer 4, and an $In_{1-x'-y'}Ga_{x'}Al_{y'}N$ layer 5 are successively grown on a (0001) face of a sapphire substrate 1.

As described above, in order to obtain a flat film, the $In_{1-x''-y''}Ga_{x''}Al_{y''}N$ layer, buffer layer 2 is grown at a low temperature at the beginning of the growth process. Subsequently, in order to form a mask for attaining selective growth, a silicon nitride film ($Si_3N_4$ film) 6 having a thickness of 0.3 μm is formed over the entire surface by plasma CVD.

That is, a hetero structure comprising the $In_{1-x'-y'}Ga_{x'}Al_{y'}N$ layer 5, the $In_{1-x-y}Ga_xAl_yN$ layer 4, and the $In_{1-x''-y''}Ga_{x''}Al_{y''}N$ layer, layer 3 is grown on the (0001) face of the sapphire substrate 1 by organometallic vapor phase epitaxy. Subsequently, the silicon nitride film ($Si_3N_4$ film) 6 serving as a mask for attaining selective growth is formed.

(2) Subsequently, as shown in FIG. 1(b), a hard-baked photoresist film 7 serving as an etching mask is formed and subjected to patterning. Subsequently, the silicon nitride film 6 and the $In_{1-x'-y'}Ga_{x'}Al_{y'}N$ layer, 5 are removed in regions in which probes are to be formed. This process is performed by use of a reactive ion etching apparatus in such a manner that first the silicon nitride film 6 is etched by use of $CF_4$, and then the $In_{1-x'-y'}Ga_{x'}Al_{y'}N$ layer 5 is etched by use of chlorine gas.

(3) Subsequently, as shown in FIG. 1(c), the photoresist layer 7 is removed by use of a plasma ashing apparatus. Subsequently, $Al_xGa_{1-x}N$ 8 is grown in a conical shape on the $In_{1-x-y}Ga_xAl_yN$ layer 4, while portions of the silicon nitride film 6 remaining after removal of the photoresist layer 7 are used as a mask for attaining selective growth.

(4) Subsequently, as shown in FIG. 1(d), the silicon nitride film 6 is removed, and the hard sapphire substrate 1 is polished by use of diamond paste in order to facilitate cutting the substrate into chips. Subsequently, the substrate 1 is cut into chips by use of a diamond scriber. In FIG. 1(d), the probe is directed downward, which is the orientation during use. The downward-directed cone 8 of $Al_xGa_{1-x}N$ serves as the probe portion, and the $In_{1-x'-y'}Ga_{x'}Al_{y'}N$ layer 5, the $In_{1-x-y}Ga_xAl_yN$ layer 4, and the $In_{1-x''-y''}Ga_{x''}Al_{y''}N$ layer 3 constitute an optical waveguide.

(5) In the above-described manner, a probe having an optical waveguide as shown in FIG. 2 is obtained. The probe has the conical portion 8 formed of $Al_xGa_{1-x}N$, and a slab waveguide 10, which is formed of the narrow-gap $In_{1-x-y}Ga_xAl_yN$ layer 4 connected to the conical portion 8 and adapted to guide excitation light, as well as the wide-gap $In_{1-x''-y''}Ga_{x''}Al_{y''}N$ layer 3 and the $In_{1-x'-y'}Ga_{x'}Al_{y'}N$ 5, which sandwich the $In_{1-x-y}Ga_xAl_yN$ layer 4.

Next, a second embodiment of the present invention will be described.

Figure 3:
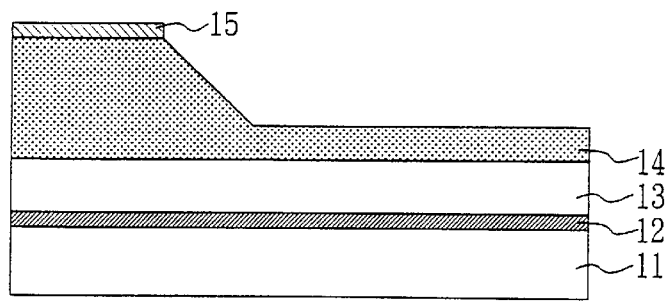
FIGS. 3(a)–3(c) are sectional views showing the steps of a method of manufacturing a probe having an optical waveguide according to a second embodiment of the present invention.
Figure 3:
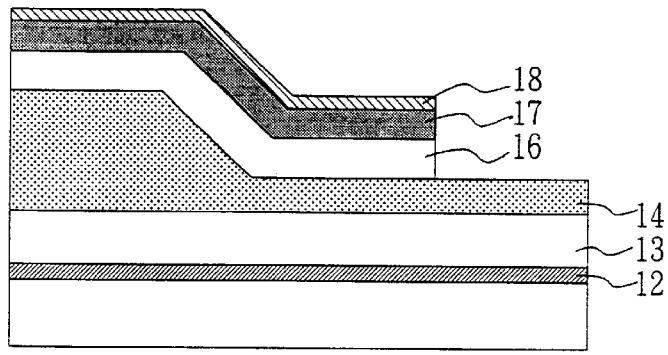
Figure 3:
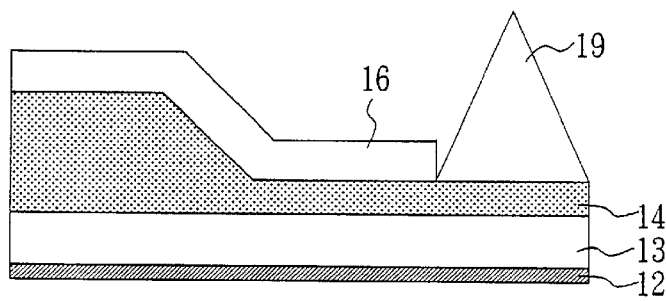
Figure 4:
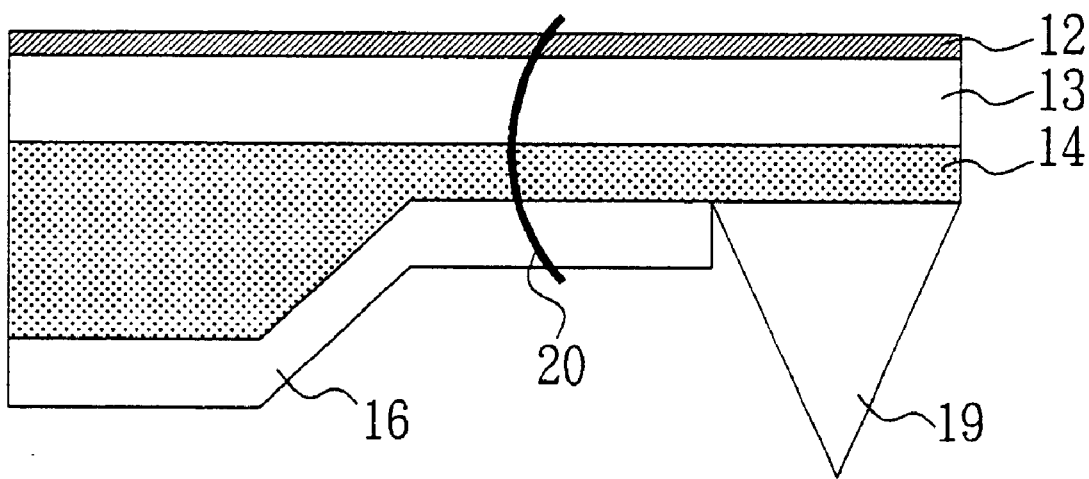
FIG. 4 is a sectional view of the probe having an optical waveguide according to the second embodiment of the present invention.

FIGS. 3(a)–3(c) are sectional views showing the steps of a method of manufacturing a probe having an optical waveguide according to a second embodiment of the present invention; and FIG. 4 is a sectional view of the probe having an optical waveguide manufactured by the method.

(1) First, as shown in FIG. 3(a), by use of organometallic vapor phase epitaxy, an $In_{1-x''-y''}Ga_{x''}Al_{y''}N$ buffer layer 12, an $In_{1-x''-y''}Ga_{x''}Al_{y''}N$ layer 13, and a thick $In_{1-x-y}Ga_xAl_yN$ layer 14 are successively grown on a (0001) face of a sapphire substrate 11. Subsequently, a photoresist layer 15 is formed and is subjected to patterning. Subsequently, etching is performed such that the $In_{1-x-y}Ga_xAl_yN$ layer 14 has a greater thickness on the side to which excitation light is introduced. Subsequently, the photoresist layer 15 is removed.

(2) Subsequently, as shown in FIG. 3(b), an $In_{1-x'-y'}Ga_{x'}Al_{y'}N$ layer 16 is grown, and a silicon nitride film ($Si_3N_4$ film) 17 having a thickness of 0.3 μm is formed over the entire surface by plasma CVD. Subsequently, a photoresist layer 18 is formed and subjected to patterning, and then a waveguide is formed by use of the thus-formed pattern.

(3) Subsequently, as shown in FIG. 3(c), $Al_xGa_{1-x}N$ 19 is grown in a conical shape to serve as a probe. Subsequently, the silicon nitride film 17 is removed, and the hard sapphire substrate 11 is polished by use of diamond paste in order to facilitate cutting the substrate into chips. Subsequently, the substrate 11 is cut into chips by use of a diamond scriber.

(4) In the above-described manner, a probe having an optical waveguide as shown in FIG. 4 is obtained. The probe has the conical portion 19 formed of $Al_xGa_{1-x}N$, and a slab waveguide 20, which is formed of the relatively thick narrow-gap $In_{1-x-y}Ga_xAl_yN$ layer 14 connected to the conical portion 19 and adapted to guide excitation light, as well as the wide-gap $In_{1-x''-y''}Ga_{x''}Al_{y''}N$ layer 13 and the $In_{1-x'-y'}Ga_{x'}Al_{y'}N$ layer 16, which sandwich the $In_{1-x-y}Ga_xAl_yN$ layer 14.

As described above, since the inlet through which excitation light enters has an increased area, the efficiency in coupling excitation light to the probe increases, so that electrons are excited efficiently by use of weak excitation light. That is, even under weak light, the electron excitation efficiency can be improved.

The above-described probe having an optical waveguide has the following features.

(1) High Efficiency $Al_xGa_{1-x}N$ is used as the material of the probe. $Al_xGa_{1-x}N$ is a wide-gap semiconductor. Since $Al_xGa_{1-x}N$ can excite electrons upon irradiation of light having a wavelength of 362 nm or less, an He—Cd laser (325 nm), an Ar laser (351 nm), an SHG laser (257.25 nm), a YAG laser (THG: 353 nm), an $N_2$ laser (337 nm), or the like may be used as a light source. In $Al_xGa_{1-x}N$, heavy holes easily couple with TE light waves, so that electrons are excited with high efficiency.

Accordingly, highly efficient spin measurement can be performed even under weak excitation light.

(2) Strength of the Probe $Al_xGa_{1-x}N$, which constitutes the probe, is a compound nitride having high hardness. Therefore, there can be obtained a probe which has a high mechanical strength and which is therefore not prone to breakage.

(3) Resistance to Strong Excitation Light $Al_xGa_{1-x}N$, which constitutes the probe, is a compound nitride having a high melting point. Therefore, there can be obtained a probe whose structure at the tip end does not change even under strong excitation light.

(4) Cleaning of the Tip of the Probe $Al_xGa_{1-x}N$ which constitutes the probe, is a compound nitride having a high melting point. Therefore, it becomes possible to remove gases and contaminants from the tip end of the probe at high temperature through electrical heating. Thus, the tip end of the probe can be cleaned.

(5) Structure of the optical waveguide for leading excitation light to the probe without causing leakage of light.

In order to integrate the optical waveguide with the probe, a slab waveguide formed of semiconductor is utilized. A double hetero structure in which a semiconductor layer having a narrow band gap is sandwiched between semiconductor layers having a wide band gap functions as a slab waveguide for light. The mode of light to be guided can be controlled through control of the thickness and the refraction index of the material of the center layer. In an exemplary case in which the probe is formed of $Al_xGa_{1-x}N$, and light having a wavelength of 325 nm (He—Cd laser) is used as excitation light, there can be used a waveguide in which an $In_{1-x-y}Ga_xAl_yN$ layer (20 nm) which does not absorb the light of 325 nm is sandwiched between $In_{1-x-y}Ga_xAl_yN$ layers. Further, the overall thickness of the waveguide is on the order of a wavelength of light to be guided, and the width of the waveguide corresponds to half the wavelength of the light. Therefore, the probe can be easily mounted on an apparatus which must be compact.

Since excitation light can be led to the tip end from the internal portion of the probe, nonuniformity in intensity of light and disorder in polarized waves, caused by reflection and absorption of excitation light at a sample surface, are mitigated.

(6) Integration of the probe portion with the optical waveguide

The optical waveguide is formed by use of organometallic vapor phase epitaxy. A single crystal of $Al_xGa_{1-x}N$ is grown, as a probe portion, on the surface of the $In_{1-x-y}Ga_xAl_yN$ layer exposed through etching of the cladding portion.

Accordingly, the probe can be integrated with the optical waveguide. Since excitation light passes through the waveguide and directly excites the entire tip end of the probe, electrons can be excited with high efficiency. In addition, nonuniformity in intensity of light and disorder in polarized waves, caused by reflection and absorption of excitation light at a sample surface, are mitigated.

The present invention is not limited to the above-described embodiments. Numerous modifications and variations of the present invention are possible in light of the spirit of the present invention, and they are not excluded from the scope of the present invention.

As described in detail, the present invention provides the following advantageous effects.

[A] In $Al_xGa_{1-x}N$, which constitutes the probe portion, heavy holes efficiently couple with TE light waves. Also, excitation light is not absorbed in the optical waveguide or leaks to the outside, while excitation light is led to the probe portion via the optical waveguide. Therefore, excitation light efficiently reaches the tip end of the probe, so that the entire tip end portion of the probe can be excited.

Since the portion of the optical waveguide which receives excitation light has an increased area, incident light from a light source disposed outside the probe can be led to the optical waveguide efficiently. Therefore, efficient spin measurement is expected under weak excitation light. Further, since no strong excitation light is required and an amount of excitation light leaking to a sample surface is small, the excitation light does not affect the surface conditions of the sample.

[B] Since the probe is formed of a hard material, the probe does not break upon contact with a sample during measurement.

[C] Since the probe is formed of a material having a high melting point, even when strong excitation light is used in order to increase the efficiency of spin measurement, the probe is not fused by the strong excitation light, and the structure of the probe does not change.

[D] Since the probe is formed of a material having a high melting point, when the tip end portion of the probe is contaminated, the tip end portion of the prove can be cleaned by a cleaning operation such that the temperature of the probe is increased through irradiation of light to the probe or heat conduction from a heater, to thereby evaporate contaminants. In order to make the probe conductive for electrical heating, an Si-doped nitride is grown to produce the probe such that the probe comes to have a resistivity on the order of 0.01 Ω·cm. Thus, it becomes possible to cause electricity to pass through the probe.

Since the shape and properties of the probe do not change even during high-temperature cleaning effected by, for example, heating through application of electricity, the status of the tip end of the probe can be maintained constant. Further, a contaminated probe can be reused.

[E] Use of organometallic vapor phase epitaxy enables simultaneous growth of a plurality of $Al_xGa_{1-x}N$ layers. That is, since a plurality of probes having the same structure can be manufactured, measurement can be performed under the same conditions for the plurality of probes. Further, the probe can be mass-produced at low cost.

INDUSTRIAL APPLICABILITY

The present invention can be utilized in the field of spin measurement in order to enable efficient performance of spin measurement even under weak excitation light.

What is claimed is:

1. A probe having an optical waveguide, characterized by comprising:

(a) an optical waveguide portion having a double hetero structure and comprising an $In_{1-x'-y'}Ga_{x'}Al_{y'}N$ layer, an $In_{1-x-y}Ga_xAl_yN$ layer, and an $In_{1-x''-y''}Ga_{x''}Al_{y''}N$ layer; and (b) an $Al_xGa_{1-x}N$ probe portion grown in a conical shape on the $In_{1-x-y}Ga_xAl_yN$ layer of the optical waveguide portion.

2. A probe having an optical waveguide, characterized by comprising:

(a) an optical waveguide portion having a double hetero structure and comprising an $In_{1-x'-y'}Ga_{x'}Al_{y'}N$ layer, an $In_{1-x-y}Ga_xAl_yN$ layer, and an $In_{1-x''-y''}Ga_{x''}Al_{y''}N$ layer, where $0 \leq x, y, x', y', x'', y'', x+y, x'+y', x''+y'' \leq 1$, and the $In_{1-x-y}Ga_xAl_yN$ layer has a minimum band gap energy; and (b) an $Al_xGa_{1-x}N$ probe portion grown in a conical shape such that the probe portion is connected to a portion of the $In_{1-x-y}Ga_xAl_yN$ layer, wherein (c) light propagating through an optical waveguide layer constituted by the $In_{1-x-y}Ga_xAl_yN$ layer is led to the probe portion in order to excite electrons at the tip end of the probe portion.

3. A probe having an optical waveguide according to claim 1, characterized in that the $In_{1-x-y}Ga_xAl_yN$ layer is formed to have a large thickness, and a portion of the layer is maintained unremoved, so that the portion serves as an inlet for incident excitation light.

4. A method of manufacturing a probe having an optical waveguide, characterized by comprising:

(a) growing on a (0001) face of a sapphire substrate a double hetero structure comprising an $In_{1-x'-y'}Ga_{x'}Al_{y'}N$ layer, an $In_{1-x-y}Ga_xAl_yN$ layer, and an $In_{1-x''-y''}Ga_{x''}Al_{y''}N$ layer by use of organometallic vapor phase epitaxy to thereby form an optical waveguide portion; and (b) growing an $Al_xGa_{1-x}N$ probe portion in a conical shape on the $In_{1-x-y}Ga_xAl_yN$ layer of the optical waveguide portion such that the $Al_xGa_{1-x}N$ prove portion is connected to the $In_{1-x-y}Ga_xAl_yN$ layer of the optical waveguide portion.

5. A method of manufacturing a probe having an optical waveguide, characterized by comprising:

(a) growing on a (0001) face of a sapphire substrate a double hetero structure comprising an $In_{1-x'-y'}Ga_{x'}Al_{y'}N$ layer, an $In_{1-x-y}Ga_xAl_yN$ layer, and an $In_{1-x''-y''}Ga_{x''}Al_{y''}N$ layer to thereby form an optical waveguide, where $0 \leq x, y, x', y', x'', y'', x+y, x'+y', x''+y'' \leq 1$, and the $In_{1-x-y}Ga_xAl_yN$ layer has a minimum band gap energy; and (b) exposing a portion of the $In_{1-x-y}Ga_xAl_yN$ layer, and growing an $Al_xGa_{1-x}N$ probe portion in a conical shape on the exposed portion of the $In_{1-x-y}Ga_xAl_yN$ layer.

6. A method of manufacturing a probe having an optical waveguide according to claim 4, characterized in that the $In_{1-x-y}Ga_xAl_yN$ layer is formed to have a large thickness, and a portion of the layer is maintained unremoved, so that the portion serves as an inlet for incident excitation light.

* * * * *